(12) United States Patent
Togashi (10) Patent No.: US 8,031,460 B2
(45) Date of Patent: Oct. 4, 2011

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 504 days.

(21) Appl. No.: 12/350,614

(22) Filed: Jan. 8, 2009

(65) Prior Publication Data

US 2009/0207553 A1    Aug. 20, 2009

(30) Foreign Application Priority Data

Feb. 14, 2008    (JP) ................................. 2008-033540

(51) Int. Cl.
    *H01G 4/228*      (2006.01)
    *H01G 4/232*      (2006.01)

(52) U.S. Cl. ............... 361/306.3; 361/306.1; 361/306.2; 361/307; 361/308.1; 361/301.4; 361/309; 361/310

(58) Field of Classification Search .... 361/306.1–306.3, 361/307, 308.1, 301.4, 309, 310, 321.2; 29/25.03
See application file for complete search history.

(56) References Cited

U.S. PATENT DOCUMENTS

| | | | | |
|---|---|---|---|---|
| 6,661,640 B2 * | 12/2003 | Togashi | ...................... | 361/306.3 |
| 6,781,816 B2 * | 8/2004 | Togashi | ...................... | 361/306.3 |
| 6,914,767 B2 * | 7/2005 | Togashi et al. | ................. | 361/303 |
| 6,922,329 B2 * | 7/2005 | Togashi | ......................... | 361/309 |
| 6,956,730 B2 * | 10/2005 | Togashi | ......................... | 361/309 |
| 6,958,899 B2 * | 10/2005 | Togashi et al. | ................. | 361/303 |
| 7,075,774 B2 * | 7/2006 | Togashi et al. | .............. | 361/306.3 |
| 7,088,569 B1 * | 8/2006 | Togashi et al. | ................. | 361/303 |
| 7,145,429 B1 * | 12/2006 | Togashi et al. | ................. | 336/200 |
| 7,164,184 B2 * | 1/2007 | Togashi | ......................... | 257/532 |
| 7,420,795 B2 * | 9/2008 | Togashi et al. | .............. | 361/306.3 |
| 7,535,694 B2 * | 5/2009 | Togashi | ..................... | 361/306.1 |
| 2003/0026059 A1 * | 2/2003 | Togashi | ......................... | 361/303 |
| 2003/0102502 A1 * | 6/2003 | Togashi | ......................... | 257/303 |

FOREIGN PATENT DOCUMENTS

| JP | A 9-148174 | | 6/1997 |
|---|---|---|---|
| JP | 2004273701 A | * | 9/2004 |
| WO | WO 2004025673 A1 | * | 3/2004 |

* cited by examiner

*Primary Examiner* — Anatoly Vortman
(74) *Attorney, Agent, or Firm* — Oliff & Berridge, PLC (57) ABSTRACT

A first internal conductor has a first portion. A second internal conductor has a lead portion and a main electrode portion. The second internal conductor is arranged in the same layer as the first internal conductor. A third internal conductor has a lead portion and a main electrode portion. The third internal conductor is arranged so as to be adjacent to the second internal conductor in a laminate direction. A fourth internal conductor has a lead portion and a main electrode portion. The fourth internal conductor is arranged so as to be adjacent to the third internal conductor in the laminate direction. When the laminate body is viewed from the laminate direction, the main electrode portion of the third internal conductor overlaps with the main electrode portions of the second and fourth internal conductors. A width of the first portion is smaller than a width of the main electrode portion of the second internal conductor in the longitudinal direction of the laminate body and a width of the main electrode portion of the second internal conductor in the transverse direction of the laminate body.

7 Claims, 10 Drawing Sheets

MULTILAYER CAPACITOR

BACKGROUND OF THE INVENTION

1. Field of the Invention

The present invention relates to a multilayer capacitor.

2. Related Background Art

A known multilayer capacitor of this kind is provided with a capacitor element body of a rectangular parallelepiped shape having a pair of principal faces of a rectangular shape facing each other, a pair of side faces extending in the longitudinal direction of the pair of principal faces so as to connect between the pair of principal faces, and facing each other, and a pair of end faces extending in the transverse direction of the pair of principal faces so as to connect between the pair of principal faces, and facing each other, and a plurality of terminal electrodes disposed on the pair of respective side faces; the capacitor element body has a plurality of dielectric layers laminated together in the facing direction of the pair of principal faces, and a plurality of internal conductors alternately arranged so as to face each other with at least one dielectric layer in between out of the plurality of dielectric layers and connected to the corresponding terminal electrodes (e.g., cf. Japanese Patent Application Laid-open No. 09-148174). In the multilayer capacitor described in the foregoing Application Laid-open No. 09-148174, the spacing is short between the terminal electrodes disposed on the pair of respective side faces and thus electric current paths are relatively short in the multilayer capacitor. As a result, it becomes feasible to make the equivalent series inductance (ESL) small.

SUMMARY OF TIE INVENTION

Incidentally, a multilayer capacitor has a further need for increase in equivalent series resistance (ESR), depending upon usage thereof For example, there is the following need in usage of the multilayer capacitor as a decoupling capacitor. The voltage decreases while the load current increases in a power supply for supplying power to a central processing unit (CPU) mounted in digital electronic equipment. The operating supply voltage tends to become unstable with sudden change of the load current. In order to stabilize this supply voltage and reduce noise, the multilayer capacitor called the decoupling capacitor is connected to the power supply. In this configuration, the multilayer capacitor supplies an electric current to the CPU during transient variation of the load current, thereby suppressing the variation in the supply voltage and reducing noise.

As the operating frequency of CPU becomes higher and higher, the load current also increases speed and magnitude. For this reason, the multilayer capacitor used as the decoupling capacitor has a need for increase in ESR while ensuring a sufficient capacitance.

However, nothing is considered about the increase in ESR with the multilayer capacitor described in the foregoing Application Laid-open No. 09-148174.

An object of the present invention is to provide a multilayer capacitor suppressing increase in ESL and achieving increase in ESR, while ensuring a sufficient capacitance.

A multilayer capacitor according to the present invention is a multilayer capacitor comprising: a laminate body of a substantially rectangular parallelepiped shape in which a plurality of dielectric layers are laminated together, the laminate body having first and second side faces extending along a laminate direction of the dielectric layers and along a longitudinal direction of the laminate body and facing each other, and third and fourth side faces extending along the laminate direction of the dielectric layers and along a transverse direction of the laminate body and facing each other; a first terminal electrode disposed on the first side face of the laminate body; a second terminal electrode disposed on the second side face of the laminate body; a first connection conductor disposed on the third side face of the laminate body; a first internal conductor having a first portion led out to the first and third side faces to be connected to the first terminal electrode and to the first connection conductor, the first internal conductor being arranged inside the laminate body; a second internal conductor having a lead portion led out to the second side face to be connected to the second terminal electrode, and a main electrode portion coupled to the lead portion, the second internal conductor being arranged in the same layer as the first internal conductor inside the laminate body; a third internal conductor having a lead portion led out to the third side face to be connected to the first connection conductor, and a main electrode portion coupled to the lead portion, the third internal conductor being arranged so as to be adjacent to the second internal conductor in the laminate direction with the dielectric layer in between inside the laminate body; and a fourth internal conductor having a lead portion led out to the second side face to be connected to the second terminal electrode, and a main electrode portion coupled to the lead portion, the fourth internal conductor being arranged so as to be adjacent to the third internal conductor in the laminate direction with the dielectric layer in between inside the laminate body, wherein when viewed from the laminate direction of the dielectric layers, the main electrode portion of the third internal conductor overlaps with the main electrode portions of the second and fourth internal conductors, and wherein a width of the first portion is smaller than a width of the main electrode portion of the second internal conductor in the longitudinal direction of the laminate body and a width of the main electrode portion of the second internal conductor in the transverse direction of the laminate body.

In the present invention, the first portion of the first internal conductor is narrow and the first internal conductor has the thin portion. For this reason, the electric resistance of the first internal conductor is high and the ESR of the multilayer capacitor is also high.

In the present invention, the main electrode portion of the third internal conductor overlaps with the main electrode portions of the second and fourth internal conductors, whereby the multilayer capacitor has a plurality of regions to establish capacitance components. Namely, a capacitance is produced between the third internal conductor and the second internal conductor and another capacitance between the third internal conductor and the fourth internal conductor. This permits the multilayer capacitor to ensure a sufficient capacitance.

In the present invention, the second internal conductor is arranged in the same layer as the first internal conductor, which permits the multilayer capacitor to ensure a high ESR and sufficient capacitance, without increase in the number of laminated layers.

In the present invention, the second terminal electrode is disposed on the second side face, whereby the width is shorter from the second terminal electrode to the ends of the second and fourth internal conductors than in a configuration wherein the second terminal electrode is disposed on the third side face. This configuration makes the electric current paths shorter between the second terminal electrode and the ends of the second and fourth internal conductors, thereby achieving reduction in ESL.

Preferably, in the third internal conductor a width of the lead portion is smaller than a width of the main electrode portion in the longitudinal direction of the laminate body and a width of the main electrode portion in the transverse direction of the laminate body.

In this case, a narrow portion of the path is formed on the electric current path of the third internal conductor, which farther increases the ESR of the multilayer capacitor.

Preferably, the first internal conductor has a second portion extending along the first side face and having a side part exposed from the first side face, and the first portion and the second portion are coupled to each other.

In this case, the area of the part of the first internal conductor exposed in the first side face is relatively large to increase the contact area between the first internal conductor and the first terminal electrode disposed on the first side face. As a result, a connection failure can be prevented between the first internal conductor and the first terminal electrode.

Preferably, the multilayer capacitor further comprises a second connection conductor disposed on the fourth side face of the laminate body; the first internal conductor further has a third portion led out to the first and fourth side faces to be connected to the first terminal electrode and to the second connection conductor; the third internal conductor further has another lead portion led out to the fourth side face to be connected to the second connection conductor; and a width of the third portion is smaller than a width of the main electrode portion of the second internal conductor in the longitudinal direction of the laminate body and a width of the main electrode portion of the second internal conductor in the transverse direction of the laminate body.

In this case, the third portion, as well as the first portion, is also narrow in the first internal conductor to further increase the electric resistance of the first internal conductor. This permits further increase in the ESR of the multilayer capacitor.

Preferably, the multilayer capacitor comprises three or more second internal conductors; at least two second internal conductors have respective sizes different from each other.

In this case, a plurality of regions to establish capacitance components are formed by the second internal conductors and the third internal conductor. Since the sizes of at least two second internal conductors are different from each other, at least two of the plurality of regions thus formed have different capacitances. This causes the multilayer capacitor to have at least two resonant frequencies whereby the multilayer capacitor is obtained with low impedance over a wide band. Use of the multilayer capacitor of this configuration enables effective reduction in noise in a wide frequency band.

Preferably, the multilayer capacitor comprises three or more fourth internal conductors; at least two fourth internal conductors have respective sizes different from each other.

In this case, a plurality of regions to establish capacitance components are formed by the third internal conductor and the fourth internal conductors. Since the sizes of at least two fourth internal conductors are different from each other, at least two of the plurality of regions thus formed have different capacitances. This causes the multilayer capacitor to have at least two resonant frequencies whereby the multilayer capacitor is obtained with low impedance over a wide band.

Preferably, the multilayer capacitor further comprises a fifth internal conductor having a fourth portion led out to the first and third side faces to be connected to the first terminal electrode and to the first connection conductor, the fifth internal conductor being arranged in the same layer as the fourth internal conductor inside the laminate body; a width of the fourth portion of the fifth internal conductor is smaller than a width of the main electrode portion of the fourth internal conductor in the longitudinal direction of the laminate body and a width of the main electrode portion of the fourth internal conductor in the transverse direction of the laminate body.

In this case, the fourth portion of the fifth internal conductor is narrow and thus the thin portion is formed in the fifth internal conductor For this reason, the electric resistance of the fifth internal conductor is also high, which further increases the ESR of the multilayer capacitor Since the fifth internal conductor is arranged in the same layer as the fourth internal conductor, it becomes feasible to increase the ESR, without increase in the number of laminated layers.

The present invention successfully provides the multilayer capacitor suppressing the increase in the ESL and achieving the increase in the ESR, while ensuring a sufficient capacitance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description, the same elements or elements with the same functionality will be denoted by the same reference symbols, without redundant description.

First Embodiment

Figure 1:
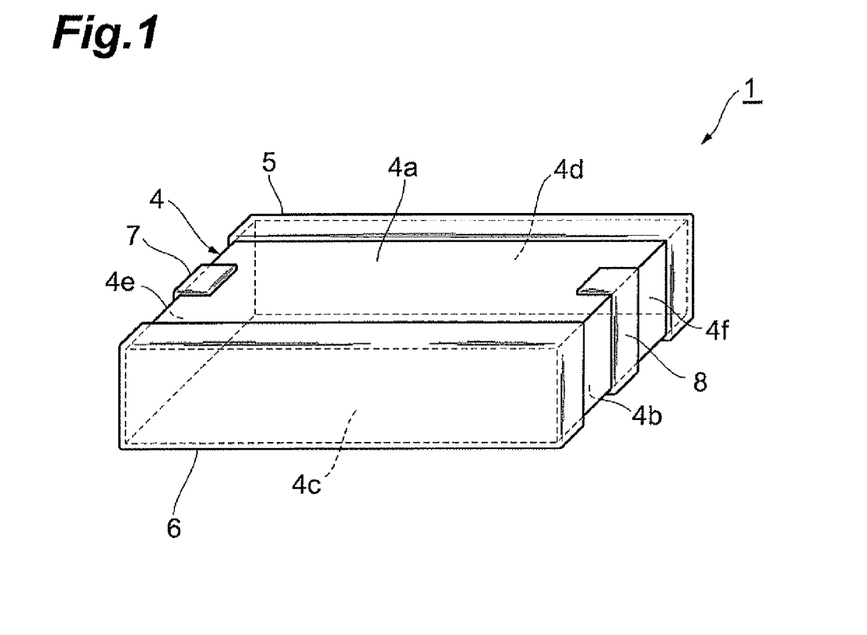
FIG. 1 is a perspective view of the multilayer capacitor according to the first embodiment.
Figure 2:
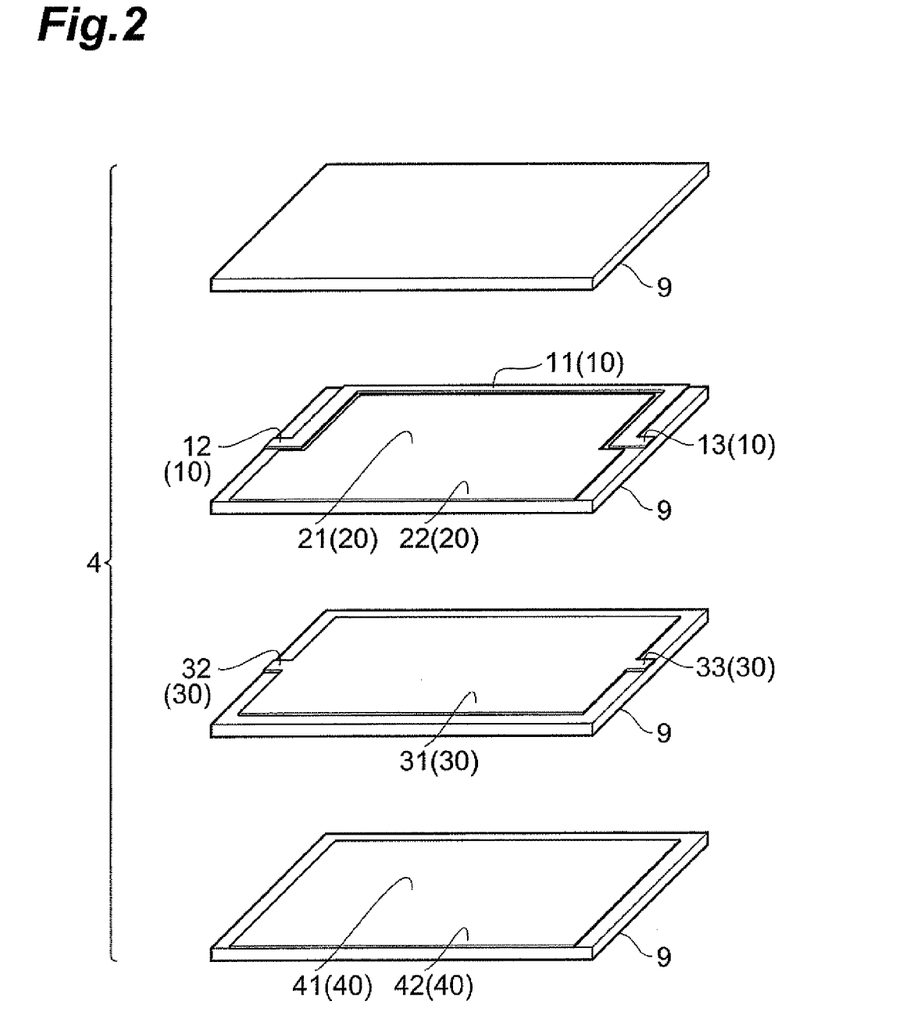
FIG. 2 is an exploded perspective view of the laminate body in the multilayer capacitor according to the first embodiment.
Figure 3:
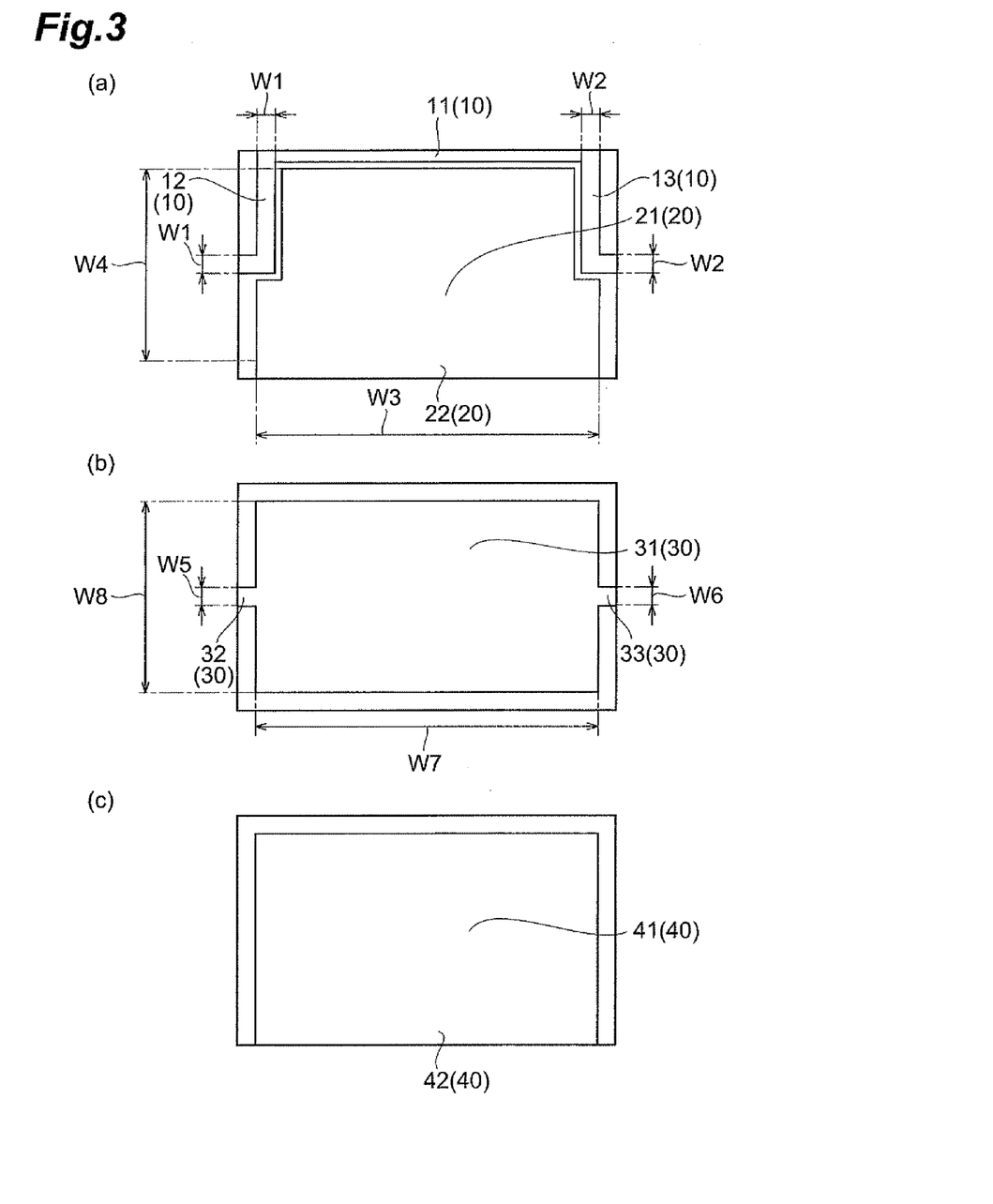
FIG. 3 is sectional views of the laminate body in the multilayer capacitor according to the first embodiment.
Figure 4:
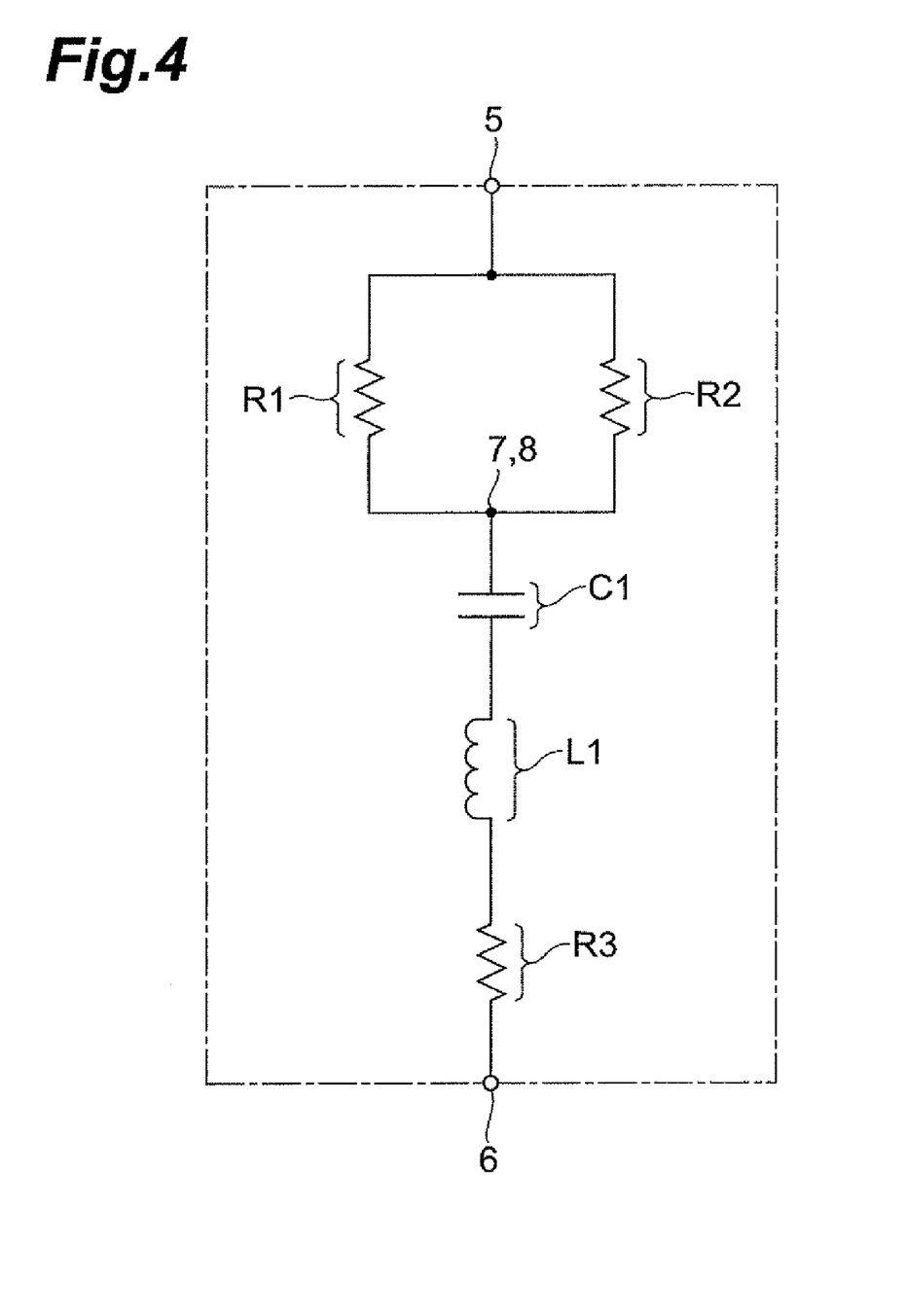
FIG. 4 is an equivalent circuit diagram of the multilayer capacitor according to the first embodiment.

FIG. 1 is a perspective view of the multilayer capacitor according to the first embodiment. FIG. 2 is an exploded perspective view of the laminate body in the multilayer capacitor according to the first embodiment. FIG. 3 is sectional views of the laminate body in the multilayer capacitor according to the first embodiment. FIG. 4 is an equivalent circuit diagram of the multilayer capacitor according to the first embodiment.

The multilayer capacitor 1, as shown in FIG. 1, has a laminate body 4, first and second terminal electrodes 5, 6 disposed on side faces of the laminate body 4, and first and second connection conductors 7, 8 disposed on side faces of the laminate body 4.

The laminate body 4 is of a rectangular parallelepiped shape and has side faces 4a-4f. The side face 4a faces the side face 4b, the side face 4c does the side face 4d, and the side face 4e the side face 4f. The side faces 4a, 4b are of a rectangular shape. The side faces 4c, 4d extend along the longer-side direction of the side faces 4a, 4b so as to connect between the side faces 4a, 4b. The side faces 4e, 4f extend along the shorter-side direction of the side faces 4a, 4b so as to connect between the side faces 4a, 4b.

The first terminal electrode 5 is arranged so as to cover the side face 4d of the laminate body 4. The second terminal electrode 6 is arranged so as to cover the side face 4c of the laminate body 4. The first connection conductor 7 is arranged nearly in the center of the side face 4e of the laminate body 4 and its two ends are located on the side faces 4a, 4b. The second connection conductor 8 is arranged nearly in the center of the side face 4f of the laminate body 4 and its two ends are located on the side faces 4a, 4b. The first and second terminal electrodes 5, 6 and the first and second connection conductors 7, 8 are made, for example, by applying an electroconductive paste containing electroconductive metal powder and glass frit, onto the corresponding side faces of the laminate body 4, and sintering it. After the sintering, the electrodes may be coated with a plated layer as occasion demands.

The laminate body 4, as shown in FIG. 2, consists of a plurality of dielectric layers 9 (four layers in the present embodiment) laminated together. The side faces 4c-4f of the laminate body 4 are surfaces extending along the laminate direction of the dielectric layers 9 and the side faces 4a, 4b are surfaces extending along the direction perpendicular to the laminate direction of the dielectric layers 9. Each dielectric layer 9 is composed, for example, of a sintered body of a ceramic green sheet containing a dielectric ceramic. The dielectric layers 9 are integrally formed so that no border can be visually recognized between the dielectric layers in the practical multilayer capacitor 1.

The multilayer capacitor 1 has a first internal conductor 10, a second internal conductor 20, a third internal conductor 30, and a fourth internal conductor 40 inside the laminate body 4. The first to fourth internal conductors 10, 20, 30, 40 are composed of sintered bodies of an electroconductive paste.

The first internal conductor 10 has a first portion 12, a second portion 11, and a third portion 13.

The first portion 12 is led out to the side faces 4d, 4e to be connected to the first terminal electrode 5 and to the first connection conductor 7. Specifically, the first portion 12 is nearly of an L-shape and extends in an equal width. An end face at one end of the first portion 12 is exposed from the side face 4d to be electrically and physically connected to the first terminal electrode 5. An end face at the other end of the first portion 12 is exposed from the side face 4e to be electrically and physically connected to the first connection conductor 7. The width W1 of the first portion 12 is smaller than the width W3 of main electrode portion 21 of the second internal conductor 20. The width W3 of the main electrode portion 21 is a length of the main electrode portion 21 in the longer-side direction of the side faces 4a, 4b. The width W1 of the first portion 12 is smaller than the width W4 of the main electrode portion 21 of the second internal conductor 20. The width W4 of the main electrode portion 21 is a length of the main electrode portion 21 in the shorter-side direction of the side faces 4a, 4b of the laminate body 4.

The second portion 11 extends along the side face 4d of the laminate body 4. The side part of the second portion 11 is exposed from the side face 4d. One end of the second portion 11 is connected to the first portion 12 and the other end of the second portion 11 is electrically and physically connected to the third portion 13.

The third portion 13 is led out to the side faces 4d, 4f of the laminate body 4 to be connected to the first terminal electrode 5 and to the second connection conductor 8. Specifically, the third portion 13 is nearly of an L-shape and extends in an equal width. An end face at one end of the third portion 13 is exposed from the side face 4d to be electrically and physically connected to the first terminal electrode 5. An end face at the other end of the third portion 13 is exposed from the side face 4f to be electrically and physically connected to the second connection conductor 8. The width W2 of the third portion 13 is smaller than the width W3 of the main electrode portion 21 of the second internal conductor 20 and the width W4 of the main electrode portion 21 of the second internal conductor 20.

The second internal conductor 20 is arranged in the same layer as the first internal conductor 10. The second internal conductor 20 has a main electrode portion 21 and a lead portion 22.

The main electrode portion 21 overlaps with main electrode portion 31 of the third internal conductor 30 with the dielectric layer 9 in between. As the main electrode portion 21 and the main electrode portion 31 overlap with each other with the dielectric layer in between, a capacitance component is established thereby. The main electrode portion 21 spreads along the longer-side direction and the shorter-side direction of the side faces 4a, 4b The lead portion 22 is coupled to the main electrode portion 21. The lead portion 22 is led out to the side face 4c to be connected to the second terminal electrode 6. Specifically, the lead portion 22 extends from the main electrode portion 21 to the side face 4c, and an end face of the lead portion 22 is exposed from the side face 4c to be electrically and physically connected to the second terminal electrode 6.

The third internal conductor 30 is arranged so as to be adjacent to the second internal conductor 20 in the laminate direction with the dielectric layer 9 in between. The third internal conductor 30 has a main electrode portion 31 and lead portions 32, 33.

The main electrode portion 31 overlaps with the main electrode portion 21 of the second internal conductor 20 with the dielectric layer 9 in between, as described above. The main electrode portion 31 also overlaps with main electrode portion 41 of the fourth internal conductor 40 with the dielectric layer 9 in between. As the main electrode portion 31 and the main electrode portion 41 overlap with each other with the dielectric layer 9 in between, a capacitance component is established thereby. The main electrode portion 31 spreads along the longer-side direction and the shorter-side direction of the side faces 4a, 4b.

The lead portion 32 is coupled to the main electrode portion 31. The lead portion 32 is led out to the side face 4e of the laminate body 4 to be connected to the first connection conductor 7. Specifically, the lead portion 32 extends from the main electrode portion 31 to the side face 4e and an end face of the lead portion 32 is exposed from the side face 4e to be electrically and physically connected to the first connection conductor 7.

The lead portion 33 is coupled to the main electrode portion 31. The lead portion 33 is led out to the side face 4f of the laminate body 4 to be connected to the second connection conductor 8. Specifically, the lead portion 33 extends from the main electrode portion 31 to the side face 4f and an end face of the lead portion 33 is exposed from the side face 4f to be electrically and physically connected to the second connection conductor 8.

The widths W5, W6 of the lead portions 32, 33 in the direction perpendicular to the extending direction of the lead portions 32, 33 are smaller than the widths W7 and W8 of the main electrode portion 31. The width W7 of the main electrode portion 31 is a length in the longer-side direction of the side faces 4a, 4b. The width W8 of the main electrode portion 31 is a length in the shorter-side direction of the side faces 4a, 4b.

The fourth internal conductor 40 is arranged so as to be adjacent to the third internal conductor 30 in the laminate direction with the dielectric layer 9 in between. Namely, the third internal conductor 30 is located between the second internal conductor 20 and the fourth internal conductor 40 in the laminate direction. The fourth internal conductor 40 has a main electrode portion 41 and a lead portion 40.

The main electrode portion 41 overlaps with the main electrode portion 31 of the third internal conductor 30 with the dielectric layer 9 in between, as described above. The lead portion 42 is coupled to the main electrode portion 41 and led out to the side face 4c. Specifically, the lead portion 42 extends from the main electrode portion 41 to the side face 4c and an end face of the lead portion 42 is exposed from the side face 4c to be electrically and physically connected to the second terminal electrode 6. The main electrode portion 41 spreads along the longer-side direction and the shorter-side direction of the side faces 4a, 4b.

FIG. 4 shows an equivalent circuit diagram of the multilayer capacitor 1. Resistance R1 is formed by the first portion 12 and the second portion 11 of the first internal conductor 10. Resistance R2 is formed by the second portion 11 and the third portion 13 of the first internal conductor 10. Capacitance component C1 is formed by the capacitance component established by the main electrode portion 21 of the second internal conductor 20 and the main electrode portion 31 of the third internal conductor 30 and the capacitance component established by the main electrode portion 31 of the third internal conductor 30 and the main electrode portion 41 of the fourth internal conductor 40. Since a capacitor has a residual inductance and a residual resistance, inductance L1 and resistance R3 are formed thereby.

In the multilayer capacitor 1 of the first embodiment having the above-described configuration, the widths W1, W2 of the first internal conductor 10 to form resistance R1, R2 are smaller than the widths W3, W4 of the main electrode portion 21 of the second internal conductor 20 and thus the thin portion is formed in the first internal conductor 10. This increases the resistance R1, R2 and thus increases the ESR of the multilayer capacitor 1.

Since the ESR of the multilayer capacitor 1 is high, a sudden impedance drop is prevented at the resonant frequency. This enables achievement of a wider band of impedance characteristics.

The capacitance component C1 is a synthesis of the capacitance component formed by the third internal conductor 30 and the second internal conductor 20 and the capacitance component formed by the third internal conductor 30 and the fourth internal conductor 40. Since there are a plurality of regions to form the capacitance component C1, it is feasible to ensure a sufficient capacitance of the multilayer capacitor 1.

Since the second internal conductor 20 is arranged in the same layer as the first internal conductor 10, it is feasible to ensure the high ESR and sufficient capacitance, without increase in the number of laminated layers.

Since the second terminal electrode 6 is disposed on the side face 4c, the length is shorter from the second terminal electrode 6 to the ends of the second and fourth internal conductors 20, 40 than in a configuration wherein the second terminal electrode 6 is disposed on the side face 4e, 4f. This makes the electric current paths shorter between the second terminal electrode 6 and the ends of the second and fourth internal conductors 20, 40, thereby achieving reduction of ESL.

In the multilayer capacitor 1 of the first embodiment, the widths W5, W6 of the lead portions 32, 33 of the third internal conductor 30 are smaller than the widths W7, W8 of the third internal conductor 30. Therefore, the narrow portions of the path are formed on the electric current path of the third internal conductor 30. As a result, the ESR of the multilayer capacitor 1 is farther increased.

In the multilayer capacitor 1 of the first embodiment, the second portion 11 of the first internal conductor 10 extends along the side face 4d of the laminate body 4 and the side part thereof is exposed from the side face 4d. Since the longitudinally extending side part of the second portion 11 is exposed from the side face 4d, the contact area is increased between the first internal conductor 10 and the first terminal electrode 5 disposed on the side face 4d. As a result, a connection failure can be prevented between the first internal conductor 10 and the first terminal electrode 5.

Second Embodiment

Figure 5:
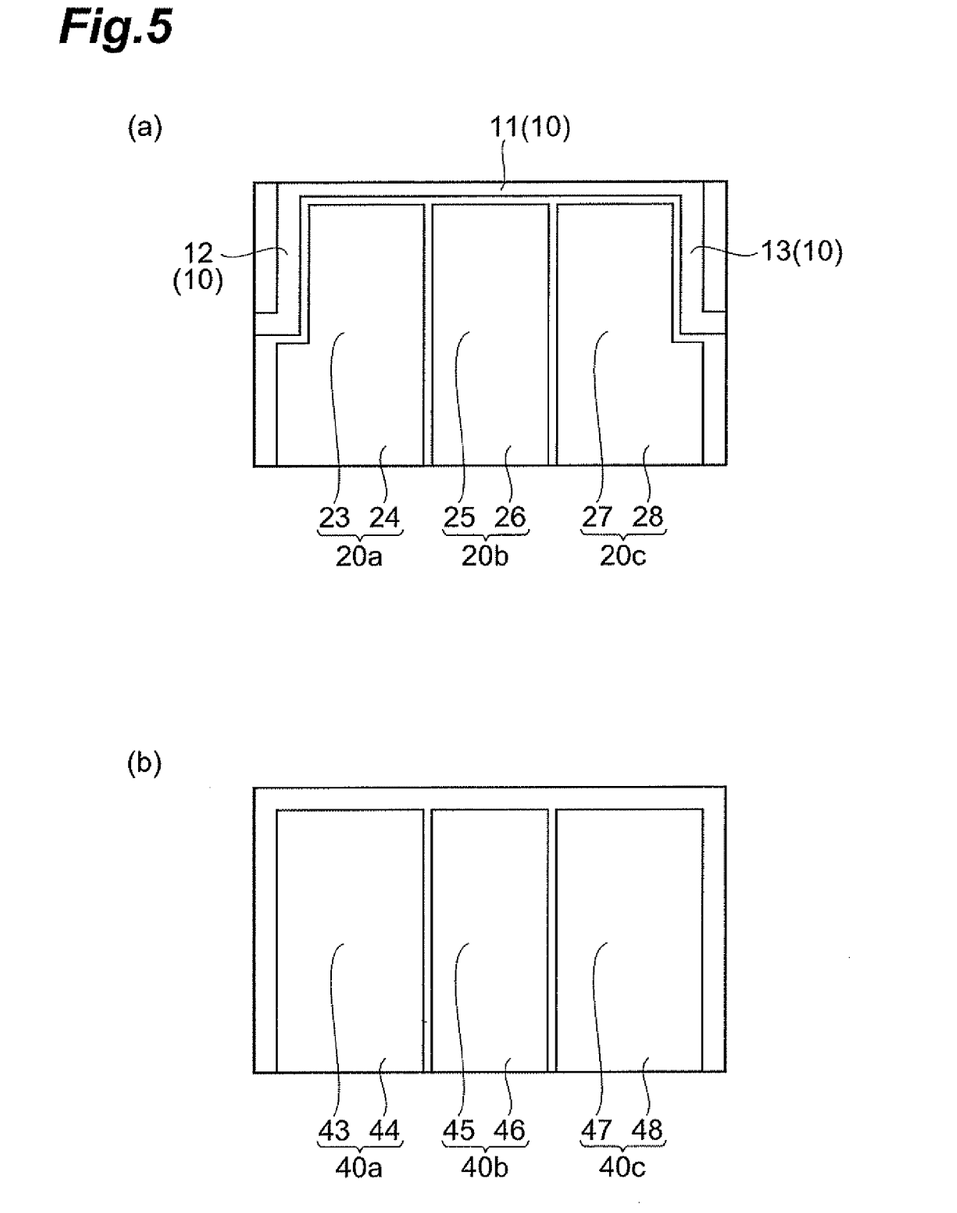
FIG. 5 is sectional views of the laminate body in the multilayer capacitor according to the second embodiment.

FIG. 5 is sectional views of the laminate body in the multilayer capacitor according to the second embodiment.

The multilayer capacitor according to the second embodiment has the laminate body 4 of the nearly rectangular parallelepiped shape, the first and second terminal electrodes 5, 6, and the first and second connection conductors 7, 8 as the multilayer capacitor 1 of the first embodiment does.

The multilayer capacitor of the second embodiment is different from the multilayer capacitor of the first embodiment in that it has a plurality of second internal conductors and fourth internal conductors, as shown in FIG. 5. The multilayer capacitor of the second embodiment has a plurality of (three in the present embodiment) second internal conductors 20a, 20b, 20c and a plurality of (three in the present embodiment) fourth internal conductors 40a, 40b, 40e.

The three second internal conductors 20a, 20b, 20c are three regions obtained by dividing the second internal conductor 20 in the multilayer capacitor of the first embodiment into three. The sizes of the respective second internal conductors 20a, 20b, 20c are different from each other.

The second internal conductor 20a has a main electrode portion 23 and a lead portion 24. The second internal conductor 20b has a main electrode portion 25 and a lead portion 26. The second internal conductor 20c has a main electrode portion 27 and a lead portion 28. The main electrode portions 23, 25, 27 overlap with the main electrode portion 31 of the third internal conductor 30 with the dielectric layer 9 in between. As the main electrode portions 23, 25, 27 and the main electrode portion 31 overlap with each other with the dielectric layer 9 in between, three capacitance components are established thereby. The lead portion 24, 26, or 28 is coupled to the main electrode portion 23, 25, or 27, respectively. The lead portions 24, 26, 28 are led out to the side face 4c of the laminate body 4 to be connected to the second terminal electrode 6.

The three fourth internal conductors 40a, 40b, 40c are three regions obtained by dividing the fourth internal conductor 40 in the multilayer capacitor of the first embodiment into three. The sizes of the respective fourth internal conductors 40a, 40b, 40c are different from each other.

The fourth internal conductor 40a has a main electrode portion 43 and a lead portion 44. The fourth internal conductor 40b has a main electrode portion 45 and a lead portion 46. The fourth internal conductor 40c has a main electrode portion 47 and a lead portion 48. The main electrode portions 43, 45, 47 overlap with the main electrode portion 31 of the third internal conductor 30 with the dielectric layer 9 in between. As the main electrode portions 43, 45, 47 and the main electrode portion 31 overlap with each other with the dielectric layer 9 in between, three capacitance components are established thereby. The lead portion 44, 46, or 48 is coupled to the main electrode portion 43, 45, or 47, respectively. The lead portions 44, 46, 48 are led out to the side face 4c of the laminate body 4 to be connected to the second terminal electrode 6.

Figure 6:
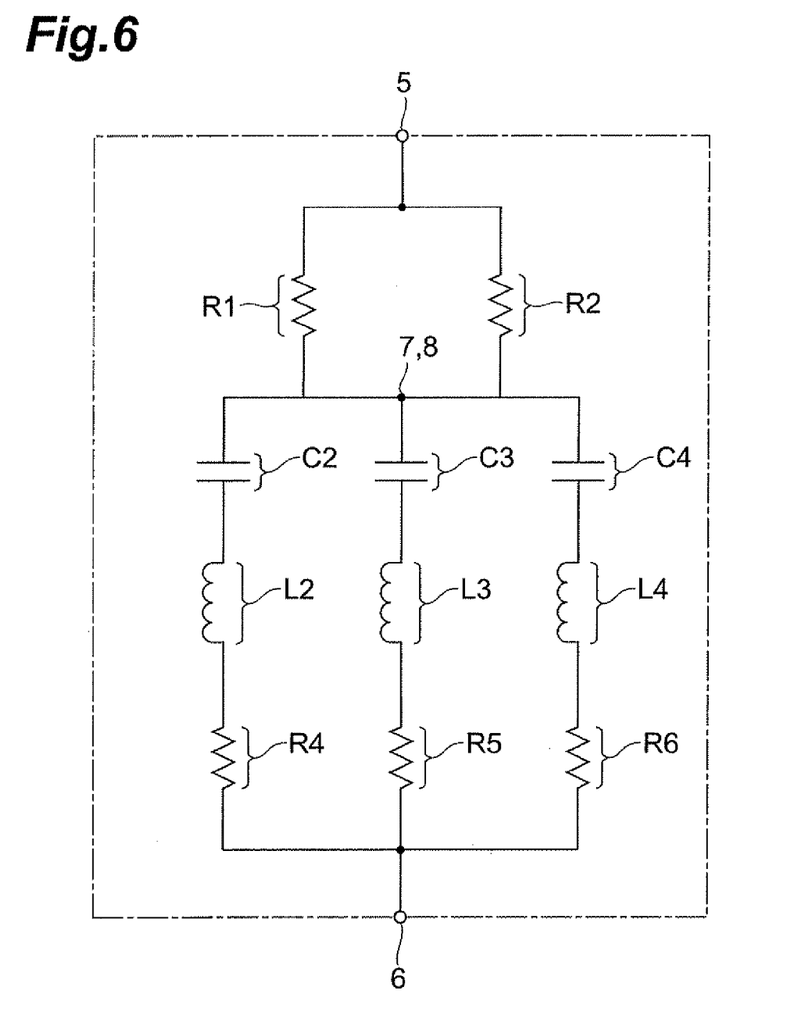
FIG. 6 is an equivalent circuit diagram of the multilayer capacitor according to the second embodiment.

FIG. 6 shows an equivalent circuit diagram of the multilayer capacitor according to the second embodiment. Resistance R1 is formed by the first portion 12 and the second portion 11 of the first internal conductor 10. Resistance R2 is formed by the second portion 11 and the third portion 13 of the first internal conductor 10. Capacitance component C2 is formed by the capacitance component established by the main electrode portion 23 of the second internal conductor 20a and the main electrode portion 31 of the third internal conductor 30 and the capacitance component established by the main electrode portion 31 of the third internal conductor 30 and the main electrode portion 43 of the fourth internal conductor 40a. Capacitance component C3 is formed by the capacitance component established by the main electrode portion 25 of the second internal conductor 20b and the main electrode portion 31 of the third internal conductor 30 and the capacitance component established by the main electrode portion 31 of the third internal conductor 30 and the main electrode portion 45 of the fourth internal conductor 40b. Capacitance component C4 is formed by the capacitance component established by the main electrode portion 27 of the second internal conductor 20c and the main electrode portion 31 of the third internal conductor 30 and the capacitance component established by the main electrode portion 31 of the third internal conductor 30 and the main electrode portion 47 of the fourth internal conductor 40c. Since a capacitor has a residual inductance and a residual resistance, inductances L2-4 and resistances R4-6 are formed thereby.

In the multilayer capacitor of the second embodiment, three regions to form the capacitance components are formed by the second internal conductors 20a, 20b, 20c and the third internal conductor 30 and the sizes of the respective second internal conductors 20a, 20b, 20c are different from each other; therefore, the three regions provide their respective capacitance values different from each other. Three regions to form the capacitance components are formed by the fourth internal conductors 40a, 40b, 40c and the third internal conductor 30 and the sizes of the respective fourth internal conductors 40a, 40b, 40c are different from each other; therefore, the three regions provide their respective capacitance values different from each other. As a result of these, the multilayer capacitor has the three capacitance components C2-C4 of different capacitance values. This causes the multilayer capacitor to have three resonant frequencies.

Figure 7:
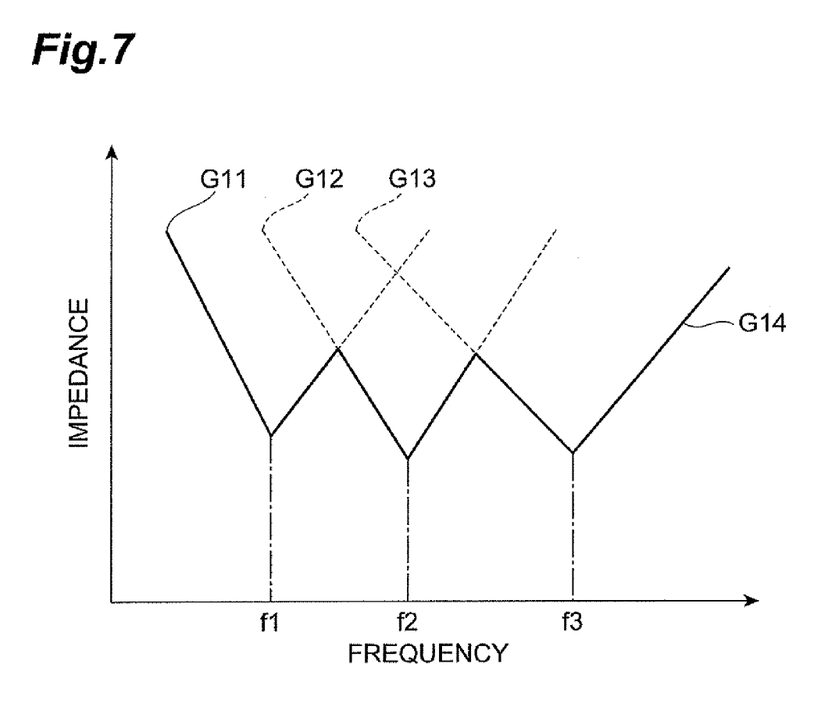
FIG. 7 is a graph showing the impedance characteristics of the multilayer capacitor according to the second embodiment.

FIG. 7 presents a graph showing the impedance-frequency characteristics of the multilayer capacitor of the second embodiment. In the graph of FIG. 7 the horizontal axis represents frequency (Hz) and the vertical axis impedance (Ω) The impedance characteristics of the capacitance component C2 alone are indicated by graph G11, in which the impedance becomes minimum at resonant frequency $f_1$. The impedance characteristics of the capacitance component C3 alone are indicated by graph G12, in which the impedance becomes minimum at resonant frequency $f_2$. The impedance characteristics of the capacitance component C4 alone are indicated by graph G13, in which the impedance becomes minimum at resonant frequency $f_3$. Since the multilayer capacitor has the capacitance components C2-C4, the impedance characteristics of the multilayer capacitor are given by graph G14.

As described above, the multilayer capacitor of the second embodiment has low impedance over a wider frequency band, when compared to the multilayer capacitor having only one capacitance. Use of such a multilayer capacitor permits achievement of noise reduction effect in a wide frequency band.

Figure 8:
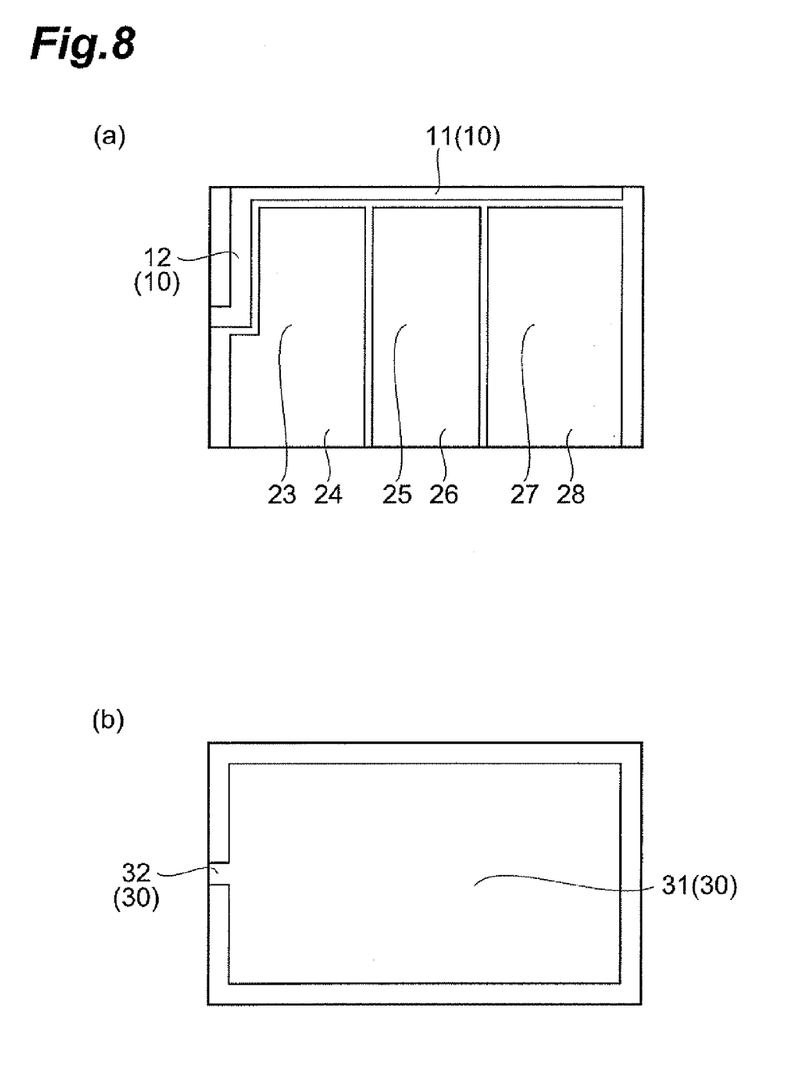
FIG. 8 is sectional views of the laminate body in the multilayer capacitor according to a modification example of the second embodiment.

A modification example of the second embodiment will be described below on the basis of FIG. 8. FIG. 8 is sectional views of the laminate body in the multilayer capacitor according to the modification example of the second embodiment. The multilayer capacitor of the present modification example is different in the shapes of the first internal conductor 10 and the third internal conductor 30 from the second embodiment.

The first internal conductor 10 of this modification example has the first portion 12 and the second portion 11. The first internal conductor 10 of the present modification example does not have the third portion 13 which the first internal conductor 10 in the preceding embodiments had. The third internal conductor 30 of the present modification example has the main electrode portion 31 and the lead portion 32. The third internal conductor 30 of the present modification example does not have the lead portion 33 which the third internal conductor 30 in the preceding embodiments had.

The multilayer capacitor of this configuration also achieves the same effect as the multilayer capacitor of the second embodiment. Since the first and third internal conductors 10, 30 do no have the third portion 13 and the lead portion 33, the multilayer capacitor 1 does not need to have the second connection conductor 8.

Figure 9:
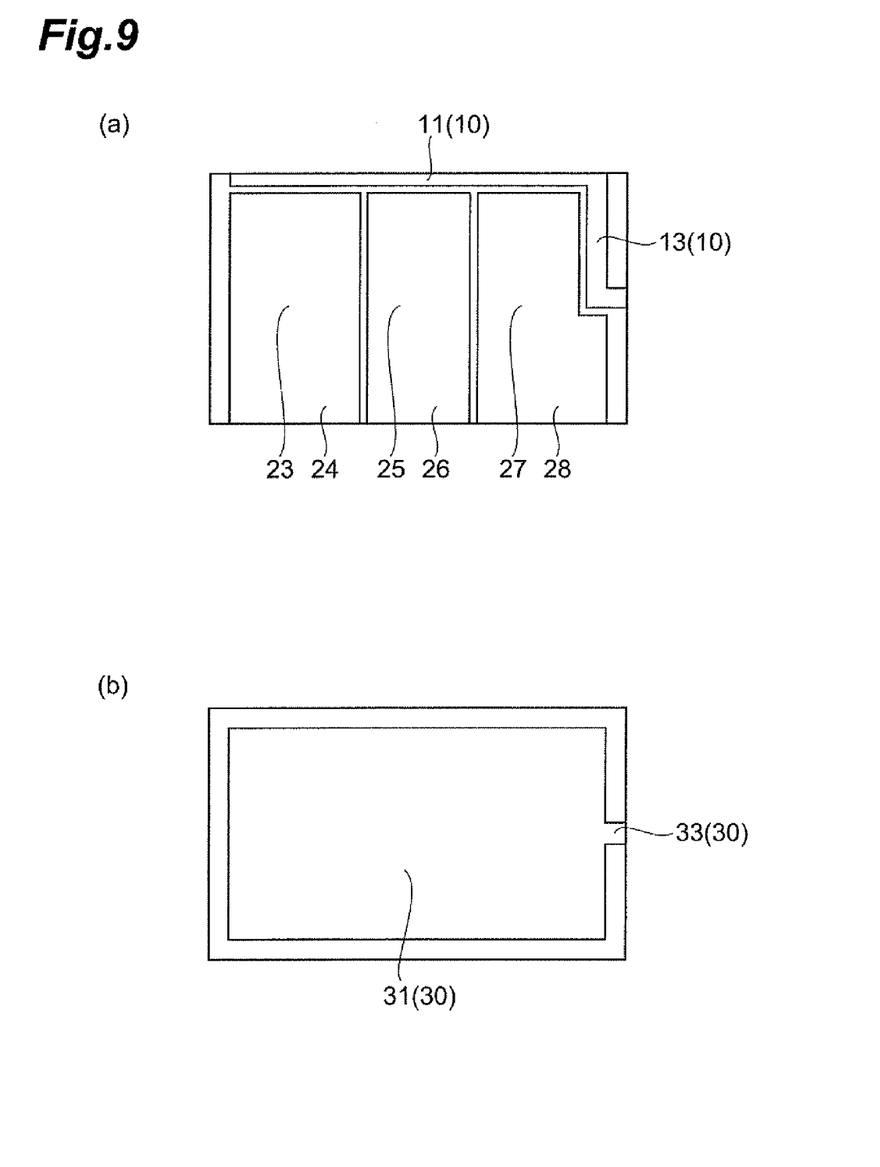
FIG. 9 is sectional views of the laminate body in the multilayer capacitor according to another modification example of the second embodiment.

Another modification example of the second embodiment will be described below on the basis of FIG. 9. FIG. 9 is sectional views of the laminate body in the multilayer capacitor according to the modification example of the second embodiment. The multilayer capacitor of the present modification example is different in the shapes of the first internal conductor 10 and the third internal conductor 30 from the second embodiment.

The first internal conductor 10 of this modification example has the second portion 11 and the third portion 13. The first internal conductor 10 of the present modification example does not have the first portion 12 which the first internal conductor 10 in the preceding embodiments had. The third internal conductor 30 of the present modification example has the main electrode portion 31 and the lead portion 33. The third internal conductor 30 of the present modification example does not have the lead portion 32 which the third internal conductor 30 in the preceding embodiments had.

The multilayer capacitor of this configuration also achieves the same effect as the multilayer capacitor of the second embodiment. Since the first and third internal conductors 10, 30 do no have the first portion 12 and the lead portion 32, the multilayer capacitor 1 does not need to have the first connection conductor 7.

The preferred embodiments of the present invention were described above, and it should be noted that the present invention does not necessarily have to be limited to the above embodiments but can be modified in various ways without departing from the scope and spirit of the invention.

It can be contemplated that a multilayer capacitor is provided with a plurality of internal electrodes of the same shape as the fourth internal conductor 40 and a plurality of internal electrodes of the same shape as the third internal conductor 30 and that these internal electrodes are alternately laminated together with the dielectric layer 9 in between. In this case, the capacitance of the multilayer capacitor can be further increased.

The first internal conductor 10 in the first embodiment had the first to third portions 12, 11, 13, but the first internal conductor 10 may be configured to have only the first and second portions 12, 11. The first internal conductor 10 may be configured to have only the second and third portions 11, 13. When the first internal conductor 10 has only the first and second portions 12, 11, the multilayer capacitor 1 does not need to have the second connection conductor 8. When the first internal conductor 10 has only the second and third portions 11, 13, the multilayer capacitor 1 does not need to have the first connection conductor 7.

Figure 10:
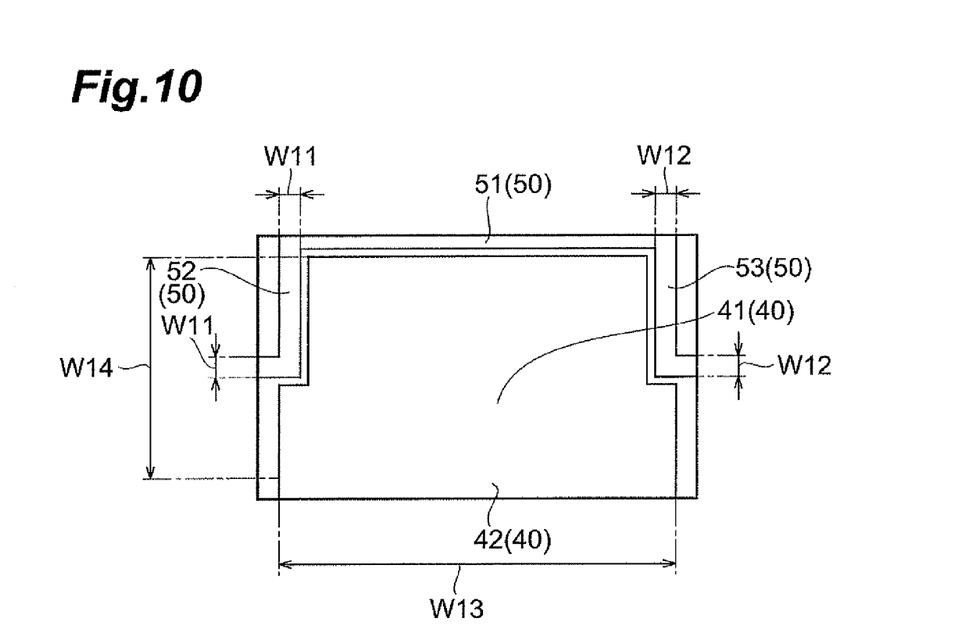
FIG. 10 is a drawing showing a fifth internal conductor.

It can also be contemplated that a fifth internal conductor is arranged in the same layer as the fourth internal conductor 40. The fifth internal conductor 50 shown in FIG. 10 has a fourth portion 52, a fifth portion 51, and a sixth portion 53. The fourth portion 52 extends from the side face 4d to the side face 4e of the laminate body 4 to be connected to the first terminal electrode 5 and to the first connection conductor 7. The fifth portion 51 extends along the side face 4d of the laminate body 4 and the side part thereof is exposed from the side face 4d. The sixth portion 53 extends from the side face 4d to the side face 4f of the laminate body 4 to be connected to the first terminal electrode and to the second connection conductor 8. The widths W11, W12 of the fourth and sixth portions 52, 53 are smaller than the width W13 and the width W14 of the main electrode portion 41. The width W13 of the main electrode portion 41 is a length of the main electrode portion 41 in the longer-side direction of the side faces 4a, 4b. The width W14 of the main electrode portion 41 is a length of the main electrode portion 41 in the shorter-side direction of the side faces 4a, 4b. When the multilayer capacitor further has the fifth internal conductor 50 having the thin portion of this configuration, the ESR of the multilayer capacitor can be further increased.

In the second embodiment the multilayer capacitor was configured to have the three second internal conductors 20a, 20b, 20c and three fourth internal conductors 40a, 40b, 40c, the number of second and fourth internal conductors does not always have to be limited to three.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
    a laminate body of a substantially rectangular parallelepiped shape in which a plurality of dielectric layers are laminated together, said laminate body having first and second side faces extending along a laminate direction of the dielectric layers and along a longitudinal direction of the laminate body and facing each other, and third and fourth side faces extending along the laminate direction of the dielectric layers and along a transverse direction of the laminate body and facing each other;
    a first terminal electrode disposed on the first side face of the laminate body;
    a second terminal electrode disposed on the second side face of the laminate body;
    a first connection conductor disposed on the third side face of the laminate body;
    a first internal conductor having a first portion led out to the first and third side faces to be connected to the first terminal electrode and to the first connection conductor, said first internal conductor being arranged inside the laminate body;
    a second internal conductor having a lead portion led out to the second side face to be connected to the second terminal electrode, and a main electrode portion coupled to the lead portion, said second internal conductor being arranged in the same layer as the first internal conductor inside the laminate body;
    a third internal conductor having a lead portion led out to the third side face to be connected to the first connection conductor, and a main electrode portion coupled to the lead portion, said third internal conductor being arranged so as to be adjacent to the second internal conductor in the laminate direction with the dielectric layer in between inside the laminate body; and
    a fourth internal conductor having a lead portion led out to the second side face to be connected to the second terminal electrode, and a main electrode portion coupled to the lead portion, said fourth internal conductor being arranged so as to be adjacent to the third internal conductor in the laminate direction with the dielectric layer in between inside the laminate body,
    wherein when viewed from the laminate direction of the dielectric layers, the main electrode portion of the third internal conductor overlaps with the main electrode portions of the second and fourth internal conductors, and
    wherein a width of the first portion is smaller than a width of the main electrode portion of the second internal conductor in the longitudinal direction of the laminate body and a width of the main electrode portion of the second internal conductor in the transverse direction of the laminate body.

2. The multilayer capacitor according to claim 1, wherein in the third internal conductor a width of the lead portion is smaller than a width of the main electrode portion in the longitudinal direction of the laminate body and a width of the main electrode portion in the transverse direction of the laminate body.

3. The multilayer capacitor according to claim 1, wherein said first internal conductor has a second portion extending along the first side face and having a side part exposed from the first side face, and wherein the first portion and the second portion are coupled to each other.

4. The multilayer capacitor according to claim 1, firer comprising a second connection conductor disposed on the fourth side face of the laminate body, wherein the first internal conductor further has a third portion led out to the first and fourth side faces to be connected to the first terminal electrode and to the second connection conductor, wherein the third internal conductor further has another lead portion led out to the fourth side face to be connected to the second connection conductor, and wherein a width of the third portion is smaller than a width of the main electrode portion of the second internal conductor in the longitudinal direction of the laminate body and a width of the main electrode portion of the second internal conductor in the transverse direction of the laminate body.

5. The multilayer capacitor according to claim 1, comprising three or more said second internal conductors, wherein at least two of the second internal conductors have respective sizes different from each other.

6. The multilayer capacitor according to claim 1, comprising three or more said fourth internal conductors, wherein at least two of the fourth internal conductors have respective sizes different from each other.

7. The multilayer capacitor according to claim 1, further comprising a fifth internal conductor having a fourth portion led out to the first and third side faces to be connected to the first terminal electrode and to the first connection conductor, said fifth internal conductor being arranged in the same layer as the fourth internal conductor inside the laminate body, wherein a width of the fourth portion of the fifth internal conductor is smaller than a width of the main electrode portion of the fourth internal conductor in the longitudinal direction of the laminate body and a width of the main electrode portion of the fourth internal conductor in the transverse direction of the laminate body.

\* \* \* \* \*